(12) United States Patent
Tsujiuchi et al.

(10) Patent No.: US 9,399,189 B2
(45) Date of Patent: Jul. 26, 2016

(54) $CO_2$ RECOVERY DEVICE

(75) Inventors: Tatsuya Tsujiuchi, Tokyo (JP); Hiroshi Tanaka, Tokyo (JP); Hiromitsu Nagayasu, Tokyo (JP); Takuya Hirata, Tokyo (JP); Tsuyoshi Oishi, Tokyo (JP); Masahiko Tatsumi, Hyogo (JP); Koji Kadono, Hyogo (JP)

(73) Assignees: MITSUBISHI HEAVY INDUSTRIES, LTD., Tokyo (JP); THE KANSAI ELECTRIC POWER CO., INC., Osaka-shi (JP)

( * ) Notice: Subject to any disclaimer, the term of this patent is extended or adjusted under 35 U.S.C. 154(b) by 206 days.

(21) Appl. No.: 14/004,708

(22) PCT Filed: Apr. 11, 2012

(86) PCT No.: PCT/JP2012/059913
§ 371 (c)(1),
(2), (4) Date: Sep. 12, 2013

(87) PCT Pub. No.: WO2012/141218
PCT Pub. Date: Oct. 18, 2012

(65) Prior Publication Data
US 2013/0340623 A1    Dec. 26, 2013

(30) Foreign Application Priority Data

Apr. 13, 2011 (JP) .................................. 2011-089435

(51) Int. Cl.
*B01D 53/14*    (2006.01)

(52) U.S. Cl.
CPC ........ *B01D 53/1425* (2013.01); *B01D 53/1406* (2013.01); *B01D 53/1475* (2013.01);
(Continued)

(58) Field of Classification Search
CPC ................... B01D 2252/204; B01D 2257/504; B01D 2258/0283; B01D 53/1406; B01D 53/1425; B01D 53/1475; Y02C 10/04; Y02C 10/06
See application file for complete search history.

(56) References Cited

U.S. PATENT DOCUMENTS 3,563,695 A    2/1971  Benson
4,678,648 A    7/1987  Wynn
(Continued)

FOREIGN PATENT DOCUMENTS

EP    0537593 A1    4/1993
JP    54-057472 A    5/1979
(Continued)

OTHER PUBLICATIONS

Translation of Written Opinion dated Jun. 26, 2012, issued in corresponding International Application No. PCT/JP2012/059913 (6 pages).

(Continued)

*Primary Examiner* — Duane Smith
*Assistant Examiner* — Cabrena Holecek
(74) *Attorney, Agent, or Firm* — Westerman, Hattori, Daniels & Adrian, LLP

(57) ABSTRACT

A $CO_2$ recovery device includes a cooling tower including a cooling unit for bringing the flue gas, which contains $CO_2$, into contact with water so as to cool flue gas; a $CO_2$-absorbing unit for bringing the flue gas into contact with a $CO_2$ absorbent (lean solution) so as to remove $CO_2$ from flue gas; and a regenerator including an absorbent regenerating unit for releasing $CO_2$ from a rich solution so as to regenerate the $CO_2$ absorbent. The $CO_2$-absorbing unit includes: a cocurrent flow $CO_2$-absorbing unit provided in a cocurrent flow $CO_2$ absorber, for bringing the flue gas into contact with the $CO_2$ absorbent in a cocurrent flow so as to remove $CO_2$ from flue gas and a countercurrent $CO_2$-absorbing unit provided in a $CO_2$ absorber, for bringing the flue gas into contact with the $CO_2$ absorbent in a countercurrent flow so as to remove $CO_2$ from flue gas.

6 Claims, 9 Drawing Sheets

(52) U.S. Cl.
CPC ..... *B01D2252/204* (2013.01); *B01D 2257/504* (2013.01); *B01D 2258/0283* (2013.01); *Y02C 10/04* (2013.01); *Y02C 10/06* (2013.01)

(56) References Cited

U.S. PATENT DOCUMENTS

| | | | |
|---|---|---|---|
| 2005/0072300 A1 | 4/2005 | Linga et al. | |
| 2009/0068078 A1 | 3/2009 | Grobys et al. | |
| 2010/0229725 A1* | 9/2010 | Farsad et al. ............ | 96/74 |

FOREIGN PATENT DOCUMENTS

| | | | |
|---|---|---|---|
| JP | 60-172335 | A | 9/1985 |
| JP | 07-246313 | A | 9/1995 |
| JP | 2005-254212 | A | 9/2005 |
| JP | 2008-062165 | A | 3/2008 |
| JP | 4099102 | B2 | 6/2008 |
| JP | 2008-238114 | A | 10/2008 |
| JP | 2008-307520 | A | 12/2008 |
| JP | 2009-520600 | A | 5/2009 |
| JP | 2009-530073 | A | 8/2009 |
| WO | 2011/009902 | A1 | 1/2011 |

OTHER PUBLICATIONS

Extended European Search Report dated Oct. 23, 2014, issued in corresponding EP Application No. 12771068.9 (6 pages).
Notice of Allowance dated Jan. 6, 2015, issued in Japanese Application No. 2011-089435, w/English translation. (4 pages).
International Search Report dated Jun. 26, 2012, issued in corresponding application No. PCT/JP2012/059913.
Written Opinion dated Jun. 26, 2012, issued in corresponding application No. PCT/JP2012/059913.
Notice of Allowance dated Nov. 30, 2015, issued in corresponding Australian Patent Application No. 2012243827. (3 pages).
Notice of Allowance dated Apr. 11, 2016, issuued in counterpart Canadian Patent Application No. 2,829,942. (1 page).

* cited by examiner

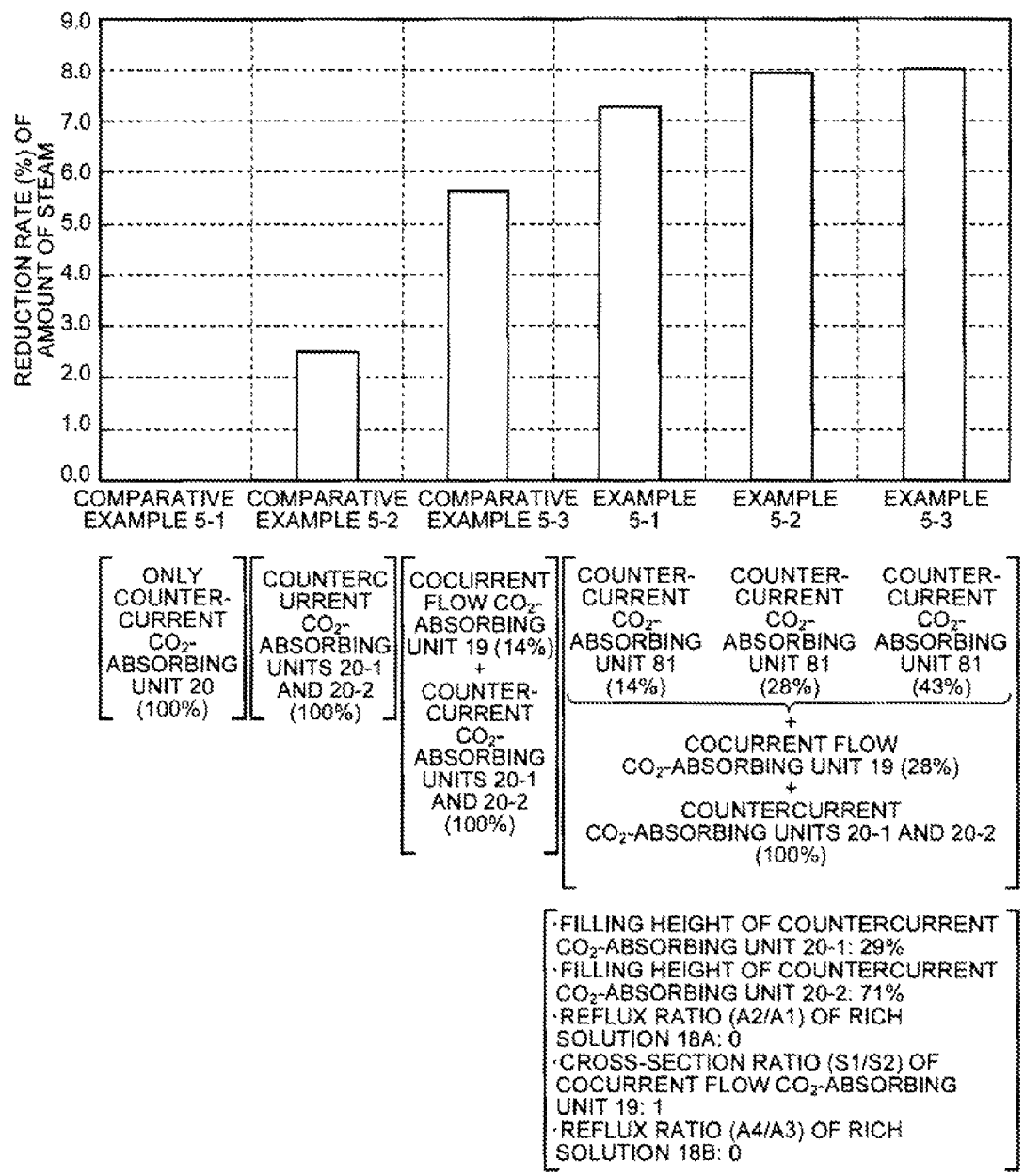

CO₂ RECOVERY DEVICE

FIELD

The present invention relates to a $CO_2$ recovery device that absorbs $CO_2$ contained in flue gas.

BACKGROUND

Flue gas, which is generated through the combustion of fossil fuel in a boiler of a thermoelectric power plant or the like using a large amount of fossil fuel, contains $CO_2$. A method of removing and recovering $CO_2$, which is contained in flue gas, by bringing flue gas, which contains $CO_2$, into gas-liquid contact with an amine-based $CO_2$ absorbent in a $CO_2$ absorber so that $CO_2$ is absorbed in the $CO_2$ absorbent, and a method of storing the recovered $CO_2$ without releasing the recovered $CO_2$ into the atmosphere have been energetically studied.

For example, there is used a method of making the $CO_2$ absorbent absorb $CO_2$, which is contained in the flue gas, in the $CO_2$ absorber to remove $CO_2$ from the flue gas, regenerating the $CO_2$ absorbent by releasing $CO_2$, which is absorbed in the $CO_2$ absorbent, in a regenerator, and reusing the $CO_2$ absorbent to remove $CO_2$ from flue gas by circulating the $CO_2$ absorbent in the $CO_2$ absorber again (for example, see Patent Literature 1). In this case, the $CO_2$ absorbent absorbing $CO_2$ releases $CO_2$ by being heated with steam in the regenerator. As a result, highly-pure $CO_2$ is recovered.

CITATION LIST

Patent Literature

Patent Literature 1: Japanese Laid-open Patent Publication NO. 2008-62165

SUMMARY

Technical Problem

Since a $CO_2$ recovery device, which uses a method of absorbing, removing, and recovering $CO_2$ from gas, which contains $CO_2$, such as flue gas, by using a $CO_2$ absorbent, is additionally installed on a combustion facility, the operating cost of the $CO_2$ recovery device should be reduced as much as possible. In particular, much thermal energy is consumed for the release of $CO_2$ in a regenerator of the $CO_2$ recovery device. Further, if the consumption of the $CO_2$ absorbent is large, the amount of a $CO_2$ absorbent to be additionally supplied is increased. Accordingly, the increase of operating cost is caused.

For this reason, there is demanded a $CO_2$ recovery device that improves $CO_2$ recovery efficiency, reduces the consumption of the $CO_2$ absorbent, and reduces operating cost when recovering $CO_2$ from the flue gas.

The invention has been made in consideration of the above-mentioned circumstances, and an object of the invention is to provide a $CO_2$ recovery device that efficiently recovers $CO_2$, reduces the consumption of a $CO_2$ absorbent, and reduces operating cost.

Solution to Problem

According to a first aspect of the present invention in order to solve the above mentioned problems, there is provided a $CO_2$ recovery device including: a cooling unit for bringing the flue gas, which contains $CO_2$, into contact with water so as to cool flue gas;
  a $CO_2$-absorbing unit for bringing the flue gas into contact with a $CO_2$ absorbent absorbing $CO_2$ so as to remove $CO_2$ from the flue gas; and
  an absorbent regenerating unit for releasing $CO_2$ from the $CO_2$ absorbent having absorbed $CO_2$ so as to regenerate the $CO_2$ absorbent, wherein
  the $CO_2$-absorbing unit includes:
  at least one countercurrent $CO_2$-absorbing unit for bringing the flue gas into contact with the $CO_2$ absorbent in a countercurrent flow so as to remove $CO_2$ from the flue gas; and
  at least one cocurrent flow $CO_2$-absorbing unit for bringing the flue gas into contact with the $CO_2$ absorbent in a cocurrent flow so as to remove $CO_2$ from the flue gas.

According to a second aspect of the present invention, there is provided the $CO_2$ recovery device according to the first aspect, wherein the $CO_2$ absorbent having absorbed $CO_2$ is cooled in the $CO_2$-absorbing unit, and is supplied to the $CO_2$-absorbing unit again.

According to a third aspect of the present invention, there is provided the $CO_2$ recovery device according to the first or second aspect, wherein the cocurrent flow $CO_2$-absorbing unit is provided on the most upstream side in a flow direction of the flue gas.

According to a fourth aspect of the present invention, there is provided the $CO_2$ recovery device according to any one of the first to third aspects, wherein the countercurrent $CO_2$-absorbing unit is provided on the most upstream side in the flow direction of the flue gas.

According to a fifth aspect of the present invention, there is provided the $CO_2$ recovery device according to any one of the first to fourth aspects, wherein at least one of the countercurrent $CO_2$-absorbing unit and the cocurrent flow $CO_2$-absorbing unit, which are included in the $CO_2$-absorbing unit, is provided in a $CO_2$ absorber for bringing the flue gas into contact with the $CO_2$ absorbent so as to remove $CO_2$ from the flue gas, and the cocurrent flow $CO_2$-absorbing unit is provided between the cooling unit and the $CO_2$ absorber.

According to a sixth aspect of the present invention, there is provided the $CO_2$ recovery device according to any one of the first to fifth aspects, wherein at least one of the countercurrent $CO_2$-absorbing unit and the cocurrent flow $CO_2$-absorbing unit, which are included in the $CO_2$-absorbing unit, is provided in the $CO_2$ absorber for bringing the flue gas into contact with the $CO_2$ absorbent so as to remove $CO_2$ from the flue gas, and the countercurrent $CO_2$-absorbing unit is provided between the cooling unit and the $CO_2$ absorber.

According to a seventh aspect of the present invention, there is provided the $CO_2$ recovery device according to any one of the first to sixth aspects, wherein the cooling unit is provided in a cooling tower for bringing the flue gas into contact with water so as to cool the flue gas, and the countercurrent $CO_2$ absorber is provided in the cooling tower.

Advantageous Effects of Invention

According to the $CO_2$ recovery device of the invention, it is possible to efficiently recover $CO_2$, to reduce the consumption of a $CO_2$ absorbent, and to reduce operating cost.

BRIEF DESCRIPTION OF DRAWINGS

FIG. 9 is a diagram illustrating a relation between the filling height of a countercurrent $CO_2$-absorbing unit and the reduction rate of the amount of steam that is consumed by the reboiler.

DESCRIPTION OF EMBODIMENTS

The invention will be described in detail below with reference to the drawings. Meanwhile, the invention is not limited by the following forms that embody the invention (hereinafter, referred to as embodiments). Further, components of the following embodiments include components that can be easily supposed by those skilled in the art and substantially the same components, that is, components corresponding to a so-called equivalent range. Furthermore, components disclosed in the following embodiments may be appropriately combined with each other.

[First Embodiment]

Figure 1:
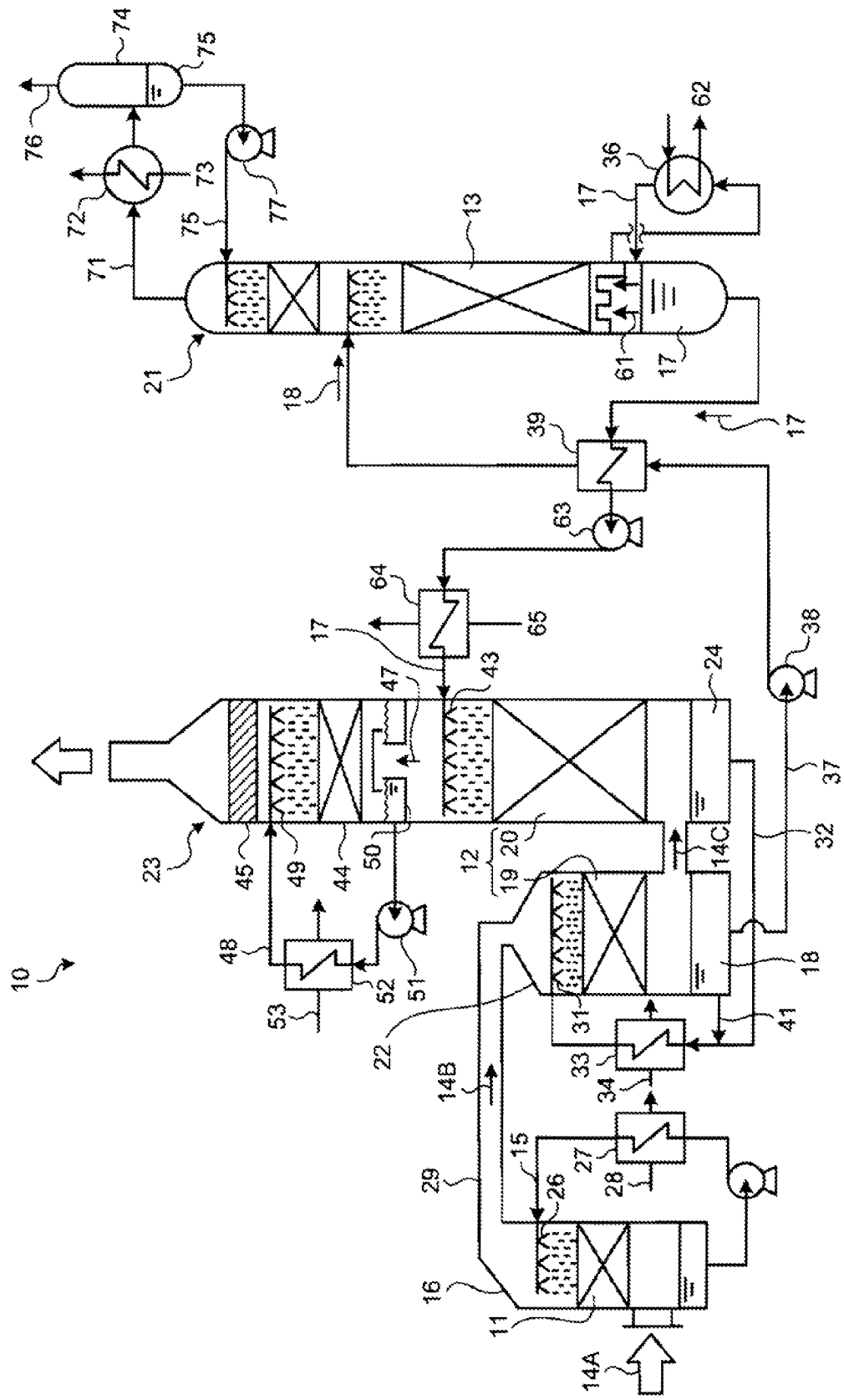
FIG. 1 is a diagram simply illustrating the structure of a $CO_2$ recovery device according to a first embodiment of the invention.

A $CO_2$ recovery device according to a first embodiment of the invention will be described with reference to the drawings. FIG. 1 is a diagram simply illustrating the structure of a $CO_2$ recovery device according to the first embodiment of the invention. As illustrated in FIG. 1, the $CO_2$ recovery device 10 according to this embodiment includes a cooling unit 11, a $CO_2$-absorbing unit 12, and an absorbent regenerating unit 13. The cooling unit 11 cools flue gas 14A by bringing the flue gas 14A containing $CO_2$ into contact with water 15, and is provided in a cooling tower 16. Further, the $CO_2$-absorbing unit 12 removes $CO_2$ from flue gas 14B by bringing the flue gas 14B into contact with a $CO_2$ absorbent (lean solution) 17 which absorbs $CO_2$. In this embodiment, the $CO_2$-absorbing unit 12 includes a cocurrent flow $CO_2$-absorbing unit 19 that removes $CO_2$ from the flue gas 14B by bringing the flue gas 14B into contact with a $CO_2$ absorbent (semi-rich solution) 24, which has absorbed $CO_2$, in a cocurrent flow, and a countercurrent $CO_2$-absorbing unit 20 that removes $CO_2$ from flue gas 14C by bringing the flue gas 14C into contact with the $CO_2$ absorbent 17 in a countercurrent flow. Furthermore, the absorbent regenerating unit 13 regenerates the $CO_2$ absorbent 17 by releasing $CO_2$ from a rich solution 18, and is provided in an absorbent regenerator (hereinafter, referred to as a regenerator) 21.

In this embodiment, the cocurrent flow $CO_2$-absorbing unit 19 is provided in a cocurrent flow $CO_2$ absorber 22 and the countercurrent $CO_2$-absorbing unit 20 is provided in a $CO_2$ absorber 23.

In this embodiment, the $CO_2$-absorbing unit 12 includes one cocurrent flow $CO_2$-absorbing unit 19 and one countercurrent $CO_2$-absorbing unit 20. However, the $CO_2$-absorbing unit 12 may include a plurality of cocurrent flow $CO_2$-absorbing units 19 and one countercurrent $CO_2$-absorbing unit 20, may include one cocurrent flow $CO_2$-absorbing unit 19 and a plurality of countercurrent $CO_2$-absorbing units 20, or may include a plurality of cocurrent flow $CO_2$-absorbing units 19 and a plurality of countercurrent $CO_2$-absorbing units 20.

In the $CO_2$ recovery device 10, the $CO_2$ absorbent 17, which absorbs $CO_2$ contained in the flue gas 14A, circulates among the cocurrent flow $CO_2$ absorber 22, the $CO_2$ absorber 23, and the regenerator 21 (hereinafter, referred to as "in a system"). In this embodiment, the rich solution 18, which has absorbed $CO_2$ contained in the flue gas 14B, is fed to the regenerator 21 from the cocurrent flow $CO_2$ absorber 22. The $CO_2$ absorbent (lean solution) 17, which is regenerated by removing almost all of $CO_2$ from the rich solution 18 in the regenerator 21, is fed to the $CO_2$ absorber 23 from the regenerator 21. The $CO_2$ absorbent (semi-rich solution) 24, which has absorbed $CO_2$ remaining in the flue gas 14C, is fed to the cocurrent flow $CO_2$ absorber 22 from the $CO_2$ absorber 23.

The flue gas 14A is gas that contains $CO_2$ discharged from industrial equipment, such as a boiler or a gas turbine. After the pressure of the flue gas 14A is increased by a flue gas blower or the like, the flue gas 14A is sent to the cooling tower 16.

The cooling tower 16 is a tower that cools the flue gas 14A by water 15. The cooling tower 16 includes spray nozzles 26 that spray the water 15 into the tower, and a cooling unit 11. The flue gas 14A is cooled by coming into counterflow contact with the water 15 sprayed from the spray nozzles 26 in the cooling unit 11 of the cooling tower 16.

The water 15 of which the temperature has become high by the heat exchange between the water 15 and the flue gas 14A is stored in the bottom of the cooling tower 16. The water 15 stored in the bottom of the cooling tower 16 is extracted from the bottom of the cooling tower 16, and is cooled by exchanging heat with cooling water 28 in a cooler 27. Then, the water 15 is fed to the cooling tower 16. Accordingly, the water 15 is circulated and used to cool the flue gas 14A.

The cooled flue gas 14B is discharged from the cooling tower 16 through a flue gas duct 29 that connects the cooling tower 16 to the $CO_2$ absorber 23, and is fed to the $CO_2$-absorbing unit 12.

As described above, the $CO_2$-absorbing unit 12 includes the cocurrent flow $CO_2$-absorbing unit 19 and the countercurrent $CO_2$-absorbing unit 20. The flue gas 14B is fed to the cocurrent flow $CO_2$ absorber 22 including the cocurrent flow $CO_2$-absorbing unit 19 and the $CO_2$ absorber 23 including the countercurrent $CO_2$-absorbing unit 20 in this order.

The cocurrent flow $CO_2$ absorber 22 is provided between the cooling tower 16 including the cooling unit 11 and the $CO_2$ absorber 23. In this embodiment, the cocurrent flow $CO_2$ absorber 22 including the cocurrent flow $CO_2$-absorbing unit 19 is provided on the most upstream side in the flow direction of the flue gas 14B flowing in the $CO_2$-absorbing unit 12. The flue gas 14B discharged from the cooling tower 16 is fed to the cocurrent flow $CO_2$ absorber 22 through the flue gas duct 29.

The cocurrent flow $CO_2$ absorber 22 is a tower that removes $CO_2$ from the flue gas 14B by bringing the flue gas 14B into contact with the semi-rich solution 24, which is discharged from the $CO_2$ absorber 23, in a cocurrent flow. The cocurrent flow $CO_2$ absorber 22 includes spray nozzles 31 and the cocurrent flow $CO_2$-absorbing unit 19 that are provided in the tower. The spray nozzles 31 spray the semi-rich solution 24 downward. After the semi-rich solution 24 is discharged from the $CO_2$ absorber 23 through a semi-rich solution extraction line 32 and is cooled by exchanging heat with cooling water 34 in a cooler 33, the semi-rich solution 24 is fed to the cocurrent flow $CO_2$ absorber 22. Further, the flue gas 14B is supplied from the top of the cocurrent flow $CO_2$ absorber 22, and flows in the tower toward the bottom of the tower.

Accordingly, since the semi-rich solution 24 is cooled before being supplied into the cocurrent flow $CO_2$ absorber 22, the semi-rich solution 24 can further absorb $CO_2$, which is contained in the flue gas 14B, in the cocurrent flow $CO_2$ absorber 22. Therefore, it is possible to increase the concentration of $CO_2$ contained in the rich solution 18 that is stored in the bottom of the cocurrent flow $CO_2$ absorber 22.

Further, since the semi-rich solution 24 is cooled before being supplied into the cocurrent flow $CO_2$ absorber 22, the semi-rich solution 24 can lower the temperature of the flue gas 14C fed to the $CO_2$ absorber 23 by coming into contact with the flue gas 14B. For this reason, as described below, it is possible to increase the absorption amount of $CO_2$, which is contained in the flue gas 14C, even in the $CO_2$ absorber 23. Accordingly, it is possible to improve the absorption efficiency of $CO_2$. Furthermore, since the temperature of the flue gas 14C fed to the $CO_2$ absorber 23 is lowered, the steam pressure of the absorbent of the lean solution 17 is reduced. Accordingly, it is possible to reduce the consumption of the absorbent. Moreover, the temperature of the absorbent rises due to the heat of reaction that is generated at the time of absorption of $CO_2$, but the flue gas 14C is cooled on the upstream side of the $CO_2$ absorber 23. Accordingly, the rise of the temperature of the absorbent is also suppressed, so that it is possible to suppress the degradation of the absorbent.

Further, in a $CO_2$ recovery device in the related art, a cooling tower 16 and a $CO_2$ absorber 23 have been connected to each other by a flue gas duct 29. In contrast, the $CO_2$ recovery device 10 according to this embodiment is provided with the cocurrent flow $CO_2$ absorber 22 on the flue gas duct 29. Accordingly, according to the $CO_2$ recovery device 10 of this embodiment, it is possible to effectively use an installation area since the cocurrent flow $CO_2$ absorber 22 is provided on the flue gas duct 29 of the $CO_2$ recovery device that has been already provided in the related art.

When the cross-sectional area of the cocurrent flow $CO_2$-absorbing unit 19 is denoted by S1 and the cross-sectional area of the countercurrent $CO_2$-absorbing unit 20 is denoted by S2, the cross-section ratio (S1/S2) of the cocurrent flow $CO_2$-absorbing unit 19 is preferably 1.0 or less, more preferably 0.8 or less, and still more preferably 0.5 or less. Accordingly, since it is possible to suitably maintain a contact rate between the semi-rich solution 24 and the flue gas 14B in the cocurrent flow $CO_2$ absorber 22, it is possible to maintain the absorption efficiency of $CO_2$ that is contained in the flue gas 14B. As a result, it is possible to reduce the amount of steam that is consumed by a regenerating superheater (reboiler) 36 of the regenerator 21. Moreover, even though the cross-section ratio (S1/S2) of the cocurrent flow $CO_2$-absorbing unit 19 is small, it is possible to suitably maintain the contact rate between the semi-rich solution 24 and the flue gas 14B in the cocurrent flow $CO_2$ absorber 22 by increasing the filling height of the cocurrent flow $CO_2$-absorbing unit 19 as much as that. Therefore, it is possible to maintain the absorption efficiency of $CO_2$ that is contained in the flue gas 14B.

Further, the semi-rich solution 24 is previously cooled in the cooler 33 before being supplied to the cocurrent flow $CO_2$ absorber 22. However, when the semi-rich solution 24 does not need to be cooled, the semi-rich solution 24 may not be cooled in the cooler 33.

The flue gas 14C, which comes into gas-liquid contact with the semi-rich solution 24 in the cocurrent flow $CO_2$ absorber 22, is sent to the $CO_2$ absorber 23 from the side wall of the bottom of the $CO_2$ absorber 23.

Furthermore, the rich solution 18, which has absorbed $CO_2$ contained in the flue gas 14B in the cocurrent flow $CO_2$-absorbing unit 19, is stored in the bottom of the cocurrent flow $CO_2$ absorber 22. The rich solution 18 stored in the bottom of the cocurrent flow $CO_2$ absorber 22 is extracted from a rich solution feed line 37; is pumped from the bottom of the cocurrent flow $CO_2$ absorber 22 by a rich solvent pump 38 that is provided outside; exchanges heat with the $CO_2$ absorbent 17, which is regenerated in the regenerator 21, in a rich/lean solution heat exchanger 39; and is then supplied into the regenerator 21 from the side surface of the regenerator.

A part of the rich solution 18, which is stored in the bottom of the cocurrent flow $CO_2$ absorber 22, may be extracted from a rich solution extraction-branch line 41, may be mixed to the semi-rich solution 24, and may circulate in the cocurrent flow $CO_2$ absorber 22 so as to be used. Accordingly, since the rich solution 18 can remove $CO_2$ from the flue gas 14B by further absorbing $CO_2$, which is contained in the flue gas 14B, in the cocurrent flow $CO_2$ absorber 22, it is possible to further increase the concentration of $CO_2$ contained in the rich solution 18. As a result, it is possible to reduce the amount of steam that is consumed by the reboiler 36.

Further, when the flow rate of the semi-rich solution 24, which is supplied to the cocurrent flow $CO_2$ absorber 22 from the $CO_2$ absorber 23, is denoted by A1 and the flow rate of the rich solution 18, where the rich solution 18 stored in the cocurrent flow $CO_2$ absorber 22 is supplied to the cocurrent flow $CO_2$ absorber 22 through the rich solution extraction-branch line 41, is denoted by A2, a reflux ratio (A2/A1) of the rich solution 18 is preferably in a range of 0 to 3 and more preferably in a range of 0 to 2. Accordingly, it is possible to efficiently absorb $CO_2$, which is contained in the flue gas 14B, while suitably maintaining the rich solution 18 that is fed to the regenerator 21 and regenerated.

The $CO_2$ absorber 23 is a tower that removes $CO_2$ from the flue gas 14C by bringing the flue gas 14C into contact with the $CO_2$ absorbent 17. The $CO_2$ absorber 23 includes the countercurrent $CO_2$-absorbing unit 20, spray nozzles 43, a water washing unit 44, and a demister 45. The flue gas 14C, which is fed into the $CO_2$ absorber 23, flows in the tower toward the top of the tower from the bottom of the tower. The spray nozzle 43 is a nozzle that sprays the $CO_2$ absorbent 17 downward. In this embodiment, the countercurrent $CO_2$-absorbing unit 20 is provided at the lower portion of the $CO_2$ absorber 23.

The flue gas 14C, which rises in the tower, comes into contact with the $CO_2$ absorbent 17, which contains, for example, a basic amine compound as a base, in a countercurrent flow in the countercurrent $CO_2$-absorbing unit 20. Accordingly, $CO_2$ contained in the flue gas 14C is absorbed in the $CO_2$ absorbent 17.

The semi-rich solution 24, which has absorbed $CO_2$ contained in the flue gas 14C in the countercurrent $CO_2$-absorbing unit 20, is stored in the bottom of the $CO_2$ absorber 23. As described above, the semi-rich solution 24, which is stored in the bottom of the $CO_2$ absorber 23, is extracted from the semi-rich solution extraction line 32, is fed to the cocurrent flow $CO_2$ absorber 22, and absorbs $CO_2$, which is contained in the flue gas 14B, by coming into contact with the flue gas 14B in a cocurrent flow.

This embodiment is not limited to a case where the semi-rich solution 24 is fed to the cocurrent flow $CO_2$ absorber 22, and the semi-rich solution 24 may be mixed to the $CO_2$ absorbent 17, which is fed to the spray nozzles 43, so as to be used to absorb $CO_2$, which is contained in the flue gas 14C, in the countercurrent $CO_2$-absorbing unit 20. Further, the semi-rich solution 24 may be supplied to both the cocurrent flow $CO_2$ absorber 22 and the countercurrent $CO_2$-absorbing unit 20.

Furthermore, the water washing unit 44 and the demister 45 are provided on the downstream side in the $CO_2$ absorber 23 in the flow direction of the flue gas 14C. In this embodiment, the water washing unit 44 and the demister 45 are provided above the countercurrent $CO_2$-absorbing unit 20 in the tower. After the $CO_2$ absorbent 17 contained in $CO_2$-removed flue gas 47, from which $CO_2$ has been removed in the countercurrent $CO_2$-absorbing unit 20, is removed from the $CO_2$-removed flue gas 47 in the water washing unit 44 and the demister 45, the $CO_2$-removed flue gas 47 is released to the outside of the system from the top of the $CO_2$ absorber 23.

Water 48, which is supplied from the outside, is sprayed in the water washing unit 44 from spray nozzles 49, so that impurities contained in the $CO_2$-removed flue gas 47 are removed in the water washing unit 44. After the water 48, which is sprayed from the spray nozzles 49, is recovered by a receiving unit 50, is fed to the outside of the tower by a pump 51, and is cooled in a cooler 52 by cooling water 53, the water 48 is fed to the spray nozzles 49 so as to be used while circulating.

In this embodiment, the $CO_2$-absorbing unit 12 includes one cocurrent flow $CO_2$-absorbing unit 19 and one countercurrent $CO_2$-absorbing unit 20. However, this embodiment is not limited thereto, and the $CO_2$-absorbing unit 12 may include a plurality of cocurrent flow $CO_2$-absorbing units 19 and one countercurrent $CO_2$-absorbing unit 20, may include one cocurrent flow $CO_2$-absorbing unit 19 and a plurality of countercurrent $CO_2$-absorbing units 20, or may include a plurality of cocurrent flow $CO_2$-absorbing units 19 and a plurality of countercurrent $CO_2$-absorbing units 20.

In this embodiment, the $CO_2$ absorber 23 includes one countercurrent $CO_2$-absorbing unit 20 that is provided therein. However, the $CO_2$ absorber 23 may include a plurality of cocurrent flow $CO_2$-absorbing units 19 and one countercurrent $CO_2$-absorbing unit 20 that are provided therein, may include one cocurrent flow $CO_2$-absorbing unit 19 and a plurality of countercurrent $CO_2$-absorbing units 20 that are provided therein, or may include a plurality of cocurrent flow $CO_2$-absorbing units 19 and a plurality of countercurrent $CO_2$-absorbing units 20 that are provided therein.

Figure 2:
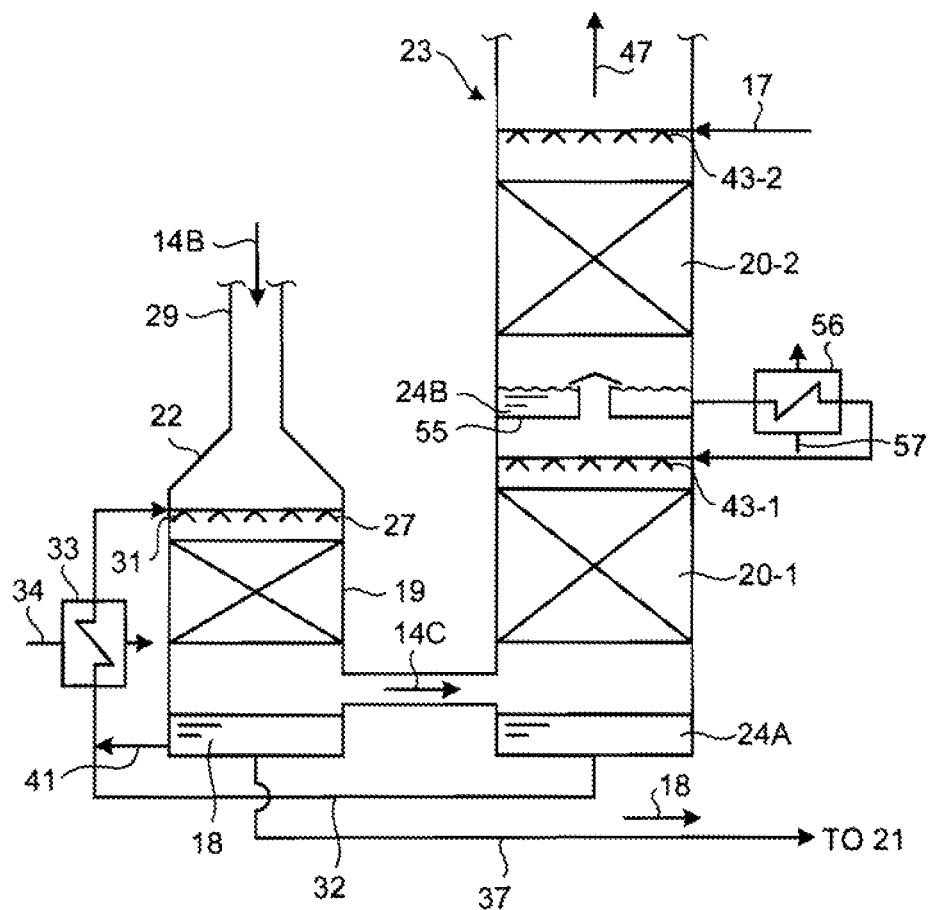
FIG. 2 is a diagram simply illustrating another structure of the $CO_2$ recovery device according to the first embodiment of the invention.

FIG. 2 is a diagram simply illustrating another structure of the $CO_2$ recovery device according to this embodiment. The $CO_2$ absorber 23 may have two stages of countercurrent $CO_2$-absorbing units 20-1 and 20-2 as illustrated in FIG. 2, or may have three or more stages. If the $CO_2$ absorber 23 is provided with the countercurrent $CO_2$-absorbing units 20-1 and 20-2, a semi-rich solution 24B, which has absorbed $CO_2$ remaining in the flue gas 14C after the lean solution 17 is sprayed from spray nozzles 43-2 and passes through the countercurrent $CO_2$-absorbing unit 20-2, is stored in a receiving unit 55. Subsequently, after the semi-rich solution 24B, which is stored in the receiving unit 55, is cooled in a cooler 56 by cooling water 57, the semi-rich solution 24B is sprayed from spray nozzles 43-1 and passes through the countercurrent $CO_2$-absorbing unit 20-1, so that the semi-rich solution 24B is changed into a semi-rich solution 24A. The semi-rich solution 24A is stored in the bottom of the $CO_2$ absorber 23.

In this case, this embodiment is not limited to a case where the semi-rich solution 24B, which has absorbed $CO_2$ in the countercurrent $CO_2$-absorbing unit 20-2, is supplied to the countercurrent $CO_2$-absorbing unit 20-1 and the semi-rich solution 24A, which has absorbed $CO_2$ in the countercurrent $CO_2$-absorbing unit 20-1, is supplied to the cocurrent flow $CO_2$-absorbing unit 19. The rich solution 18 that has absorbed $CO_2$ in the cocurrent flow $CO_2$-absorbing unit 19, and the semi-rich solutions 24A and 24B that have absorbed $CO_2$ in the countercurrent $CO_2$-absorbing units 20-1 and 20-2, respectively, may be supplied to the cocurrent flow $CO_2$-absorbing unit 19 and any one or both of the countercurrent $CO_2$-absorbing units 20-1 and 20-2 again after being cooled.

Further, the rich solution 18, which is stored in the bottom of the cocurrent flow $CO_2$ absorber 22 as illustrated in FIG. 1, is supplied to the regenerator 21 as described above. The regenerator 21 is a tower that includes the absorbent regenerating unit 13 and regenerates the rich solution 18 as the lean solution 17 by releasing $CO_2$ from the rich solution 18. The rich solution 18, which is released into the regenerator 21 from the top of the regenerator 21, is heated by steam 61 that is supplied from the bottom of the regenerator 21. The steam 61 is generated by the heat exchange between the lean solution 17 and saturated steam 62 in the regenerating superheater (reboiler) 36. The rich solution 18 absorbs heat by being heated by the steam 61, so that most of $CO_2$ contained in the rich solution 18 is released. When reaching the bottom of the regenerator 21, the rich solution 18 is changed into the $CO_2$ absorbent (lean solution) 17 from which almost all $CO_2$ has been removed.

After the lean solution 17, which is stored in the bottom of the regenerator 21, is fed as a $CO_2$ absorbent by a lean solvent pump 63 and is cooled in a lean solvent cooler 64 by the heat exchange with cooling water 65, the lean solution 17 is fed to the $CO_2$ absorber 23.

Meanwhile, $CO_2$ gas 71 containing vapor is released from the top of the regenerator 21. After the $CO_2$ gas 71 containing vapor is discharged from the top of the regenerator 21, vapor contained in the $CO_2$ gas 71 is condensed in a condenser 72 by cooling water 73, and water 75 is separated by a separation drum 74. After that, $CO_2$ gas 76 is released to the outside of the system and is recovered. Further, the water 75, which is separated by the separation drum 74, is supplied to the upper portion of the regenerator 21 by a condensed water circulating pump 77.

As described above, the $CO_2$ recovery device 10 according to this embodiment includes the cocurrent flow $CO_2$ absorber 22 that includes the cocurrent flow $CO_2$-absorbing unit 19 and is provided between the cooling tower 16 and the $CO_2$ absorber 23, and uses the semi-rich solution 24, which has absorbed $CO_2$ contained in the flue gas 14C in the $CO_2$ absorber 23, as an absorbent that further absorbs $CO_2$ contained in the flue gas 14B in the cocurrent flow $CO_2$ absorber 22. Accordingly, it is possible to increase the concentration of $CO_2$ contained in the rich solution 18 that is stored in the bottom of the cocurrent flow $CO_2$ absorber 22. Moreover, since the semi-rich solution 24 is previously cooled before being supplied into the cocurrent flow $CO_2$ absorber 22, it is possible to lower the temperature of the flue gas 14C that is fed to the $CO_2$ absorber 23. For this reason, it is also possible to increase the absorption amount of $CO_2$, which is contained in the flue gas 14C, in the $CO_2$ absorber 23 and to reduce the consumption of the absorbent. In addition, since it is possible to provide the cocurrent flow $CO_2$ absorber 22 on the flue gas duct 29 of the $CO_2$ recovery device that has been already provided, it is possible to effectively use an installation area.

Accordingly, since it is possible to efficiently use steam required for releasing $CO_2$, which is contained in the $CO_2$ absorbent 17, in the regenerator 21 without the waste of steam, it is possible to increase the operating efficiency of the $CO_2$ recovery device 10.

Meanwhile, the $CO_2$ recovery device 10 according to this embodiment is adapted so that the countercurrent $CO_2$-absorbing unit 20 is provided in the $CO_2$ absorber 23. However, this embodiment is not limited thereto and the countercurrent $CO_2$-absorbing unit 20 may be provided between the cooling unit 11 and the $CO_2$ absorber 23.

The $CO_2$ recovery device 10 according to this embodiment is not limited to a case where the $CO_2$ recovery device 10 is applied to recover $CO_2$ contained in the flue gas 14A, and may be suitably used as a device that brings an ingredient contained in flue gas into gas-liquid contact with liquid such as water, such as flue gas desulphurization equipment.

[Second Embodiment]

A $CO_2$ recovery device according to a second embodiment of the invention will be described with reference to the drawings. Since the structure of the $CO_2$ recovery device according to this embodiment is the same as the structure of the above-mentioned $CO_2$ recovery device illustrated in FIG. 1, a diagram illustrating the structure of the $CO_2$ recovery device will not be provided and description will be made using only drawings illustrating the structure of a cooling tower and a $CO_2$ absorber. Meanwhile, the same members as the members of the $CO_2$ recovery device illustrated in FIGS. 1 and 2 are denoted by the same reference numerals and the description thereof will not be made. Further, a case where two countercurrent $CO_2$-absorbing units 20 are provided as illustrated in FIG. 2 will be described in this embodiment.

Figure 3:
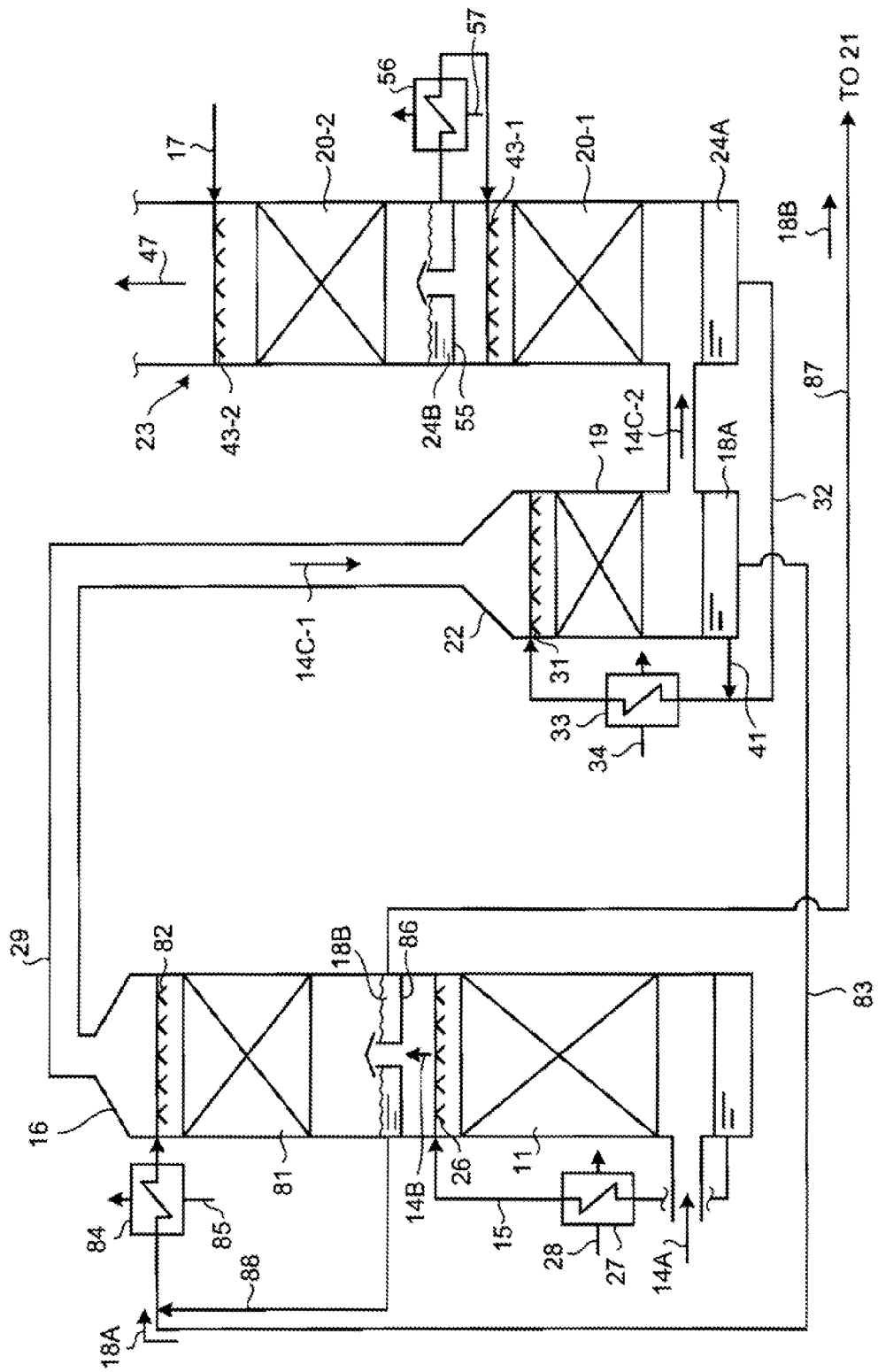
FIG. 3 is a diagram simply illustrating a part of the structure of a $CO_2$ recovery device according to a second embodiment of the invention.

FIG. 3 is a diagram simply illustrating a part of the structure of the $CO_2$ recovery device according to the second embodiment of the invention. As illustrated in FIG. 3, the $CO_2$ recovery device according to this embodiment has a structure where the $CO_2$ recovery device according to the first embodiment illustrated in FIG. 2 further includes a countercurrent $CO_2$-absorbing unit 81 provided on the most upstream side in the flow direction of the flue gas 14B. That is, the $CO_2$ recovery device according to the embodiment includes countercurrent $CO_2$-absorbing units 20-1 and 20-2 that are provided in the $CO_2$ absorber 23, the cocurrent flow $CO_2$ absorber 22 that is provided between the cooling tower 16 and the $CO_2$ absorber 23, and the countercurrent $CO_2$-absorbing unit 81 that is provided on the downstream side of the cooling unit 11, which is provided in the cooling tower 16, in the gas flow direction (in an upper portion of the tower).

The cooling tower 16 includes spray nozzles 82 and the countercurrent $CO_2$-absorbing unit 81 that are provided therein. The countercurrent $CO_2$-absorbing unit 81 removes $CO_2$ from the flue gas 14B by bringing the cooled flue gas 14B into contact with a rich solution 18A, which is discharged from the cocurrent flow $CO_2$ absorber 22, in a countercurrent flow.

The spray nozzles 82 spray the rich solution 18A downward. After the rich solution 18A is discharged from the cocurrent flow $CO_2$ absorber 22 through a rich solution extraction line 83 and is cooled in a cooler 84 by the heat exchange with cooling water 85, the rich solution 18A is fed to the cocurrent flow $CO_2$ absorber 22.

The countercurrent $CO_2$-absorbing unit 81 is provided on the downstream side of the cooling unit 11 in the gas flow direction. In this embodiment, the countercurrent $CO_2$-absorbing unit 81 is provided above the cooling unit 11 of the cooling tower 16. For this reason, the flue gas 14B, which is cooled in the cooling unit 11 of the cooling tower 16, flows to the countercurrent $CO_2$-absorbing unit 81.

After coming into contact with the cooled flue gas 14B in the countercurrent $CO_2$-absorbing unit 81, the rich solution 18A is stored in a receiving unit 86.

The flue gas 14B, which is supplied to the countercurrent $CO_2$-absorbing unit 81, comes into counterflow contact with the rich solution 18A in the countercurrent $CO_2$-absorbing unit 81. The rich solution 18A absorbs $CO_2$, which is contained in the flue gas 14B, by coming into counterflow contact with the flue gas 14B in the cocurrent flow $CO_2$ absorber 22. Accordingly, it is possible to remove $CO_2$ from the flue gas 14B.

The rich solution 18A is stored in the receiving unit 86 after coming into contact with the cooled flue gas 14B in the countercurrent $CO_2$-absorbing unit 81. However, a rich solution 18B, which is stored in the receiving unit 86, is extracted from a rich solution feed line 87, and is supplied to the regenerator 21.

The $CO_2$ recovery device according to this embodiment uses the semi-rich solution 24A, which is discharged from the $CO_2$ absorber 23, as an absorbent that absorbs $CO_2$ contained in flue gas 14C-1 in the cocurrent flow $CO_2$ absorber 22. Further, the $CO_2$ recovery device uses the rich solution 18A, which is discharged from the cocurrent flow $CO_2$ absorber 22, as an absorbent that further absorbs $CO_2$ contained in the flue gas 14B in the cooling tower 16. That is, the rich solution 18A is an absorbent that has absorbed $CO_2$ contained in the flue gas 14C-1 in the cocurrent flow $CO_2$ absorber 22 and has absorbed $CO_2$ contained in flue gas 14C-2 in the $CO_2$ absorber 23. For this reason, it is possible to further increase the concentration of $CO_2$ contained in the rich solution 18B, which is stored in the receiving unit 86 of the cooling tower 16, by using the rich solution 18A as an absorbent that further absorbs $CO_2$ contained in the flue gas 14B in the countercurrent $CO_2$-absorbing unit 81.

A part of the rich solution 18B, which is stored in the receiving unit 86, may be extracted from a rich solution extraction-branch line 88, may be mixed to the rich solution 18A, and may circulate in the countercurrent $CO_2$-absorbing unit 81 so as to be used. Accordingly, since the rich solution 18A can remove $CO_2$ from the flue gas 14B by further absorbing $CO_2$, which is contained in the flue gas 14B, in the countercurrent $CO_2$-absorbing unit 81, it is possible to further increase the concentration of $CO_2$ contained in the rich solution 18B.

Moreover, as for the flow rate A3 of the rich solution 18A that is supplied to the cooling tower 16 from the cocurrent flow $CO_2$ absorber 22 and the flow rate A4 of the rich solution 18B, where the rich solution 18B stored in the cooling tower 16 is supplied to the cooling tower 16 through the rich solution extraction-branch line 88, a reflux ratio (A4/A3) of the rich solution 18B is preferably in a range of 0 to 3 and more preferably in a range of 0 to 2. Accordingly, it is possible to absorb $CO_2$, which is contained in the flue gas 14B, while suitably maintaining the rich solution 18B that is fed to the regenerator 21 and regenerated.

Further, since the rich solution 18A is cooled before being supplied into the cooling tower 16, the rich solution 18A can lower the temperature of the flue gas 14C-1 fed to the $CO_2$ absorber 23 by coming into contact with the flue gas 14B. Furthermore, since the semi-rich solution 24A is also cooled before being supplied into the cocurrent flow $CO_2$ absorber 22, the semi-rich solution 24A also can lower the temperature of the flue gas 14C-2 that is fed to the $CO_2$ absorber 23. For this reason, it is possible to increase the absorption amount of $CO_2$, which is contained in the flue gas 14C, in the $CO_2$ absorber 23. Accordingly, it is possible to improve the absorption efficiency of $CO_2$ and to reduce the consumption of the absorbent.

In addition, since the $CO_2$ recovery device according to this embodiment is provided with the cocurrent flow $CO_2$ absorber 22 on the flue gas duct 29 of the $CO_2$ recovery device having been already provided and is provided with the countercurrent $CO_2$-absorbing unit 81 on the downstream side in the cooling tower 16 in the gas flow direction (in an upper portion of the tower), it is possible to effectively use an installation area.

As described above, according to the $CO_2$ recovery device of this embodiment, since it is possible to improve the absorption efficiency of $CO_2$, which is contained in the flue gas 14A, into a $CO_2$ absorbent 17 and to reduce the consumption of the absorbent contained in the $CO_2$ absorbent 17, it is possible to efficiently use the $CO_2$ absorbent 17. Accordingly, since it is possible to efficiently use steam required for releasing $CO_2$, which is contained in the $CO_2$ absorbent 17, in the regenerator 21 without the waste of steam, it is possible to further increase the operating efficiency of the $CO_2$ recovery device. Further, it is also possible to more effectively apply this embodiment to the device that has been already provided.

[Examples]

Next, the test results of the reduction rate of the amount of steam, which is consumed by the reboiler when the $CO_2$ recovery device according to this embodiment is used, will be described.

<When the cocurrent flow $CO_2$ absorber was provided between the cooling tower and the $CO_2$ absorber>

When the cocurrent flow $CO_2$ absorber 22 was provided between the cooling tower 16 and the $CO_2$ absorber 23 as in the $CO_2$ recovery device 10 according to the first embodiment of the invention illustrated in FIG. 1, the reduction rate of the amount of steam consumed by the reboiler 36 was examined in each of a case where the height of the cocurrent flow $CO_2$-absorbing unit 19 of the cocurrent flow $CO_2$ absorber 22 was changed, a case where the reflux ratio (A2/A1) of the semi-rich solution 24 circulating in the cocurrent flow $CO_2$ absorber 22 was changed, and a case where the cross-section ratio (S1/S2) between the cocurrent flow $CO_2$ absorber 22 and the $CO_2$ absorber 23 was changed. Hereinafter, description will be made with reference to the $CO_2$ recovery device 10 according to the first embodiment of the invention illustrated in FIG. 1.

[A Relation Between the Filling Height of the Countercurrent $CO_2$-Absorbing Unit 20 of the Cocurrent Flow $CO_2$ Absorber 22 and the Reduction Rate of the Amount of Steam Consumed by the Reboiler 36]

Figure 4:
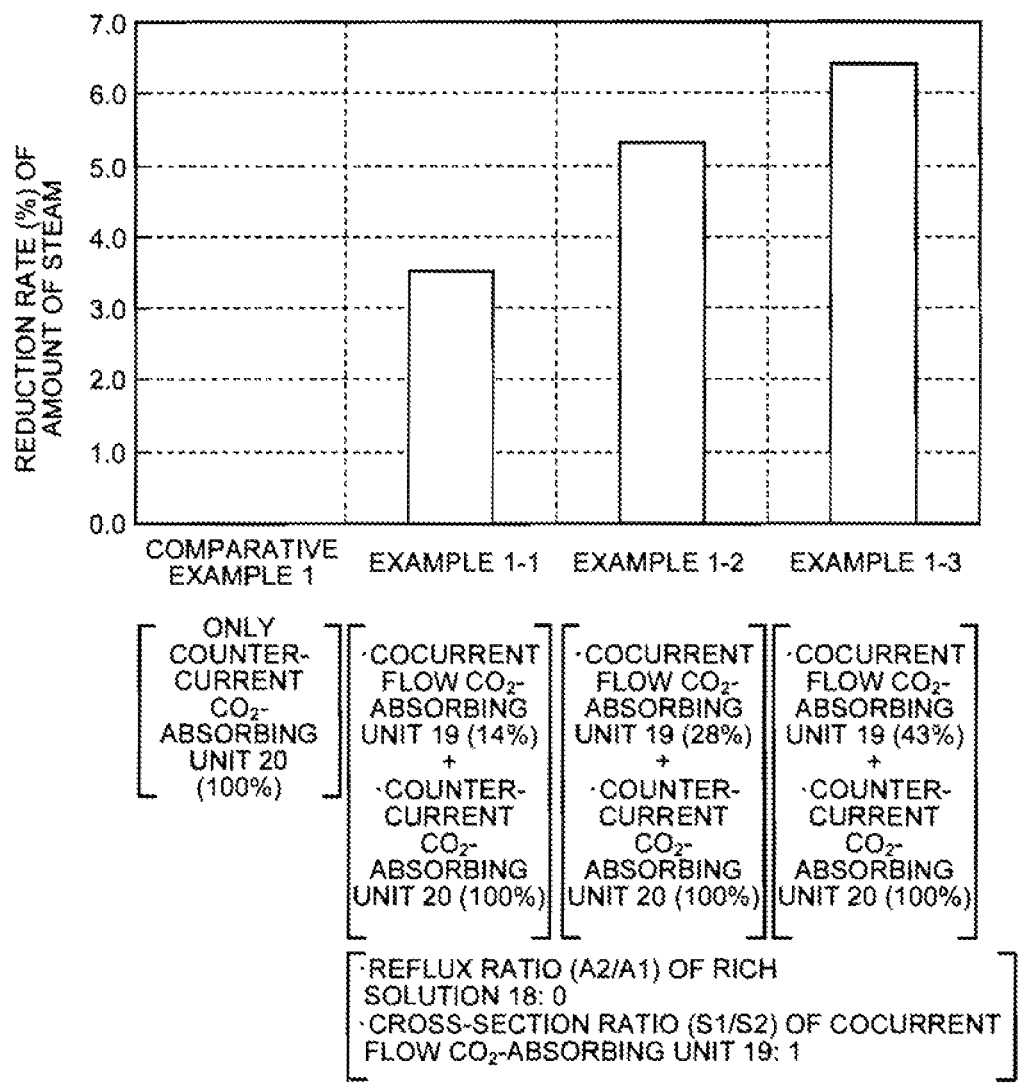
FIG. 4 is a diagram illustrating a relation between the filling height of a cocurrent flow $CO_2$-absorbing unit of a cocurrent flow $CO_2$ absorber and the reduction rate of the amount of steam that is consumed by a reboiler.

FIG. 4 is a diagram illustrating a relation between the filling height of the cocurrent flow $CO_2$-absorbing unit 19 of the cocurrent flow $CO_2$ absorber 22 and the reduction rate of the amount of steam that is consumed by the reboiler 36. Meanwhile, Comparative Example 1 is a test example where the filling height of the countercurrent $CO_2$-absorbing unit 20 of the $CO_2$ absorber 23 is 100% in a $CO_2$ recovery device in the related art without the cocurrent flow $CO_2$ absorber 22. In Comparative Example 1, the amount of steam consumed by the reboiler 36 was a reference value (0%). Example 1-1 is a test example where the filling height of the cocurrent flow $CO_2$-absorbing unit 19 of the cocurrent flow $CO_2$ absorber 22 is 14% when the filling height of the countercurrent $CO_2$-absorbing unit 20 of the $CO_2$ absorber 23 is 100%. Example 1-2 is a test example where the height of the cocurrent flow $CO_2$-absorbing unit 19 of the cocurrent flow $CO_2$ absorber 22 is 28% when the height of the countercurrent $CO_2$-absorbing unit 20 of the $CO_2$ absorber 23 is 100%. Example 1-3 is a test example where the height of the cocurrent flow $CO_2$-absorbing unit 19 of the cocurrent flow $CO_2$ absorber is 43% when the height of the countercurrent $CO_2$-absorbing unit 20 of the $CO_2$ absorber 23 is 100%. In all of Examples 1-1 to 1-3, the reflux ratio (A2/A1) of the rich solution 18 between the flow rate A1 of the semi-rich solution 24, which is supplied to the cocurrent flow $CO_2$ absorber 22 from the $CO_2$ absorber 23, and the flow rate A2 of the rich solution 18, where the rich solution 18 stored in the cocurrent flow $CO_2$ absorber 22 is supplied to the cocurrent flow $CO_2$ absorber 22 through the rich solution extraction-branch line 41, was 0 and the cross-section ratio (S1/S2) of the cocurrent flow $CO_2$-absorbing unit 19 between the cross-sectional area S1 of the cocurrent flow $CO_2$-absorbing unit 19 and the cross-sectional area S2 of the countercurrent $CO_2$-absorbing unit 20 was 1.

As illustrated in FIG. 4, the reduction rate of the amount of steam consumed by the reboiler 36 was increased as the filling height of the cocurrent flow $CO_2$-absorbing unit 19 of the cocurrent flow $CO_2$ absorber 22 was increased. Accordingly, when the cocurrent flow $CO_2$ absorber 22 is provided on the flue gas duct 29, it is possible to increase the reduction rate of the amount of steam consumed by the reboiler 36 as the filling height of the cocurrent flow $CO_2$-absorbing unit 19 of the cocurrent flow $CO_2$ absorber 22 is increased.

[A Relation Between the Reflux Ratio (A2/A1) of the Semi-Rich Solution 24 Where the Semi-Rich Solution 24 is Circulated Again in the Cocurrent Flow $CO_2$ Absorber 22 and the Reduction Rate of the Amount of Steam Consumed by the Reboiler 36]

Figure 5:
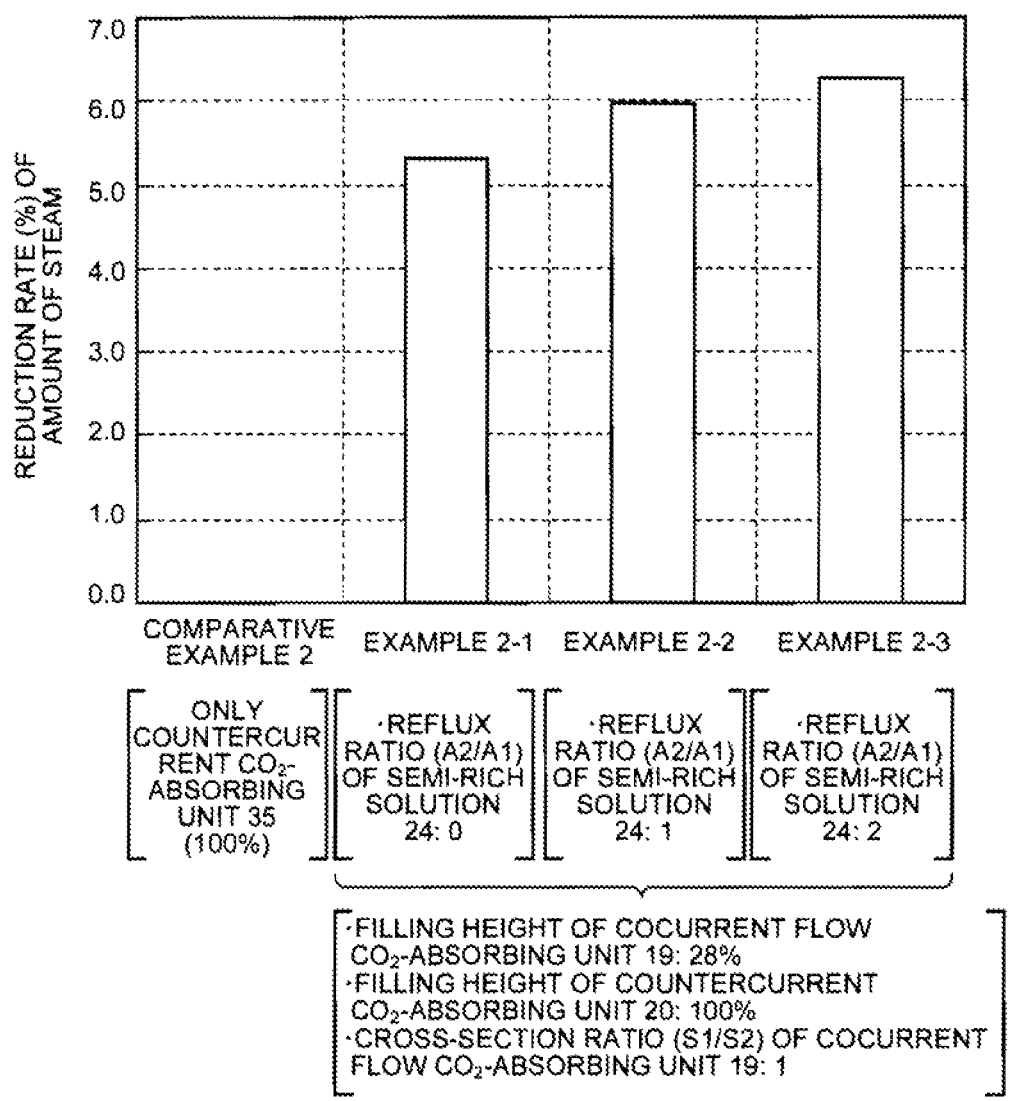
FIG. 5 is a diagram illustrating a relation between a reflux ratio of a semi-rich solution where a semi-rich solution is circulated again in the cocurrent flow $CO_2$ absorber and the reduction rate of the amount of steam that is consumed by the reboiler.

FIG. 5 is a diagram illustrating a relation between the reflux ratio (A2/A1) of the semi-rich solution 24 where the semi-rich solution 24 is circulated again in the cocurrent flow $CO_2$ absorber 22 and the reduction rate of the amount of steam that is consumed by the reboiler 36. Meanwhile, Comparative Example 2 is a test example where the filling height of the countercurrent $CO_2$-absorbing unit 20 of the $CO_2$ absorber 23 is 100% in the $CO_2$ recovery device in the related art without the cocurrent flow $CO_2$ absorber 22 as in Comparative Example 1. In Comparative Example 2, the amount of steam consumed by the reboiler 36 was a reference value (0%). Each of Examples 2-1 to 2-3 is a test example where the height of the cocurrent flow $CO_2$-absorbing unit 19 of the cocurrent flow $CO_2$ absorber 22, when the height of the countercurrent $CO_2$-absorbing unit 20 of the $CO_2$ absorber 23 is 100%, is 28% so that the cross-section ratio (S1/S2) is 1. In Example 2-1, the reflux ratio of the semi-rich solution 24 was 0. In Example 2-2, the reflux ratio of the semi-rich solution 24 was 1. In Example 2-3, the reflux ratio of the semi-rich solution 24 was 2.

As illustrated in FIG. 5, the reduction rate of the amount of steam consumed by the reboiler 36 was increased as the reflux ratio (A2/A1) of the rich solution 18 circulated in the cocurrent flow $CO_2$ absorber 22 was increased. Accordingly, when the cocurrent flow $CO_2$ absorber 22 is provided on the flue gas duct 29, it is possible to increase the reduction rate of the amount of steam consumed by the reboiler 36 as the reflux ratio of the rich solution 18 circulated in the cocurrent flow $CO_2$ absorber 22 is increased.

[A Relation Between the Cross-Section Ratio of the Cocurrent Flow $CO_2$ Absorber 22 and the Reduction Rate of the Amount of Steam Consumed by the Reboiler 36]

Figure 6:
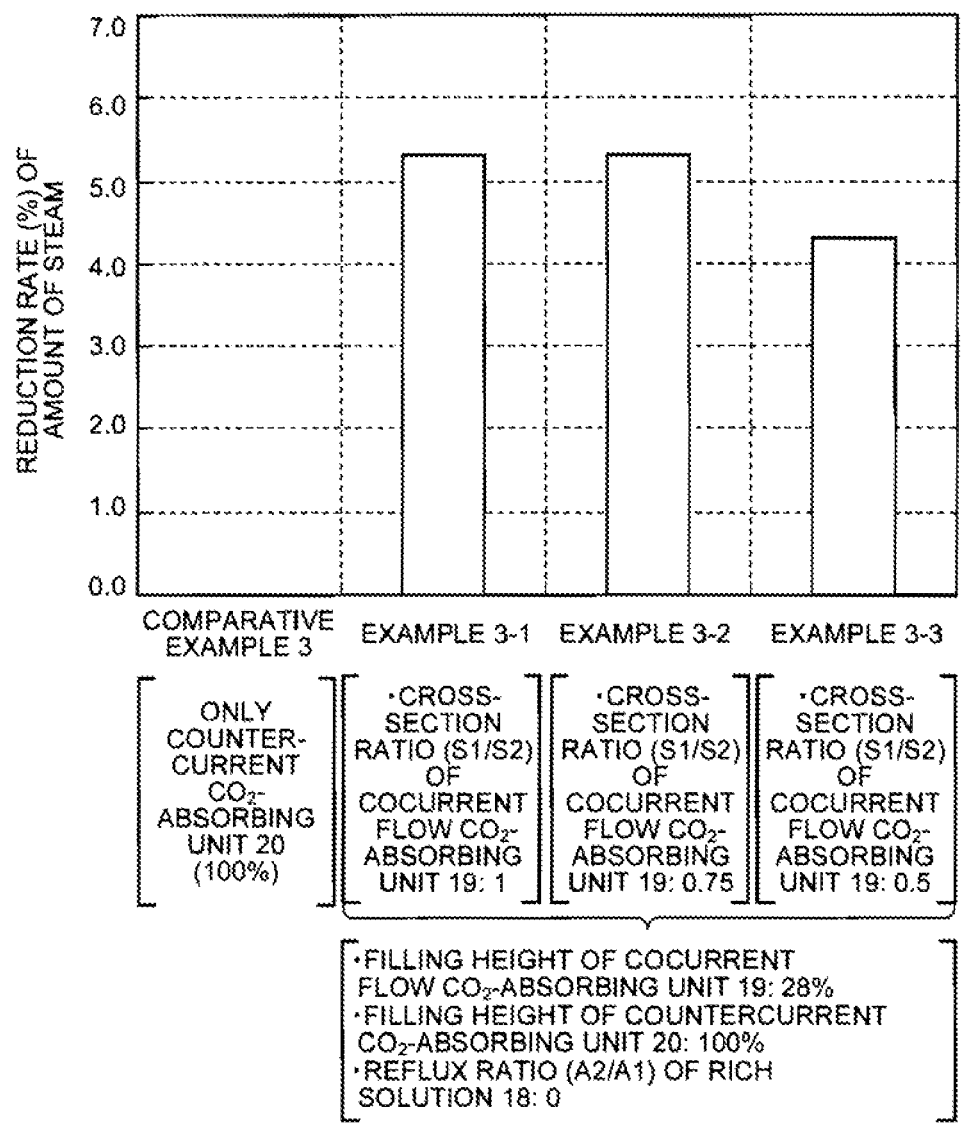
FIG. 6 is a diagram illustrating a relation between a cross-section ratio of the cocurrent flow $CO_2$ absorber and the reduction rate of the amount of steam that is consumed by the reboiler.

FIG. 6 is a diagram illustrating a relation between the cross-section ratio of the cocurrent flow $CO_2$ absorber 22 and the reduction rate of the amount of steam that is consumed by the reboiler 36. Meanwhile, Comparative Example 3 is a test example where the filling height of the countercurrent $CO_2$- absorbing unit 20 of the $CO_2$ absorber 23 is 100% in the $CO_2$ recovery device in the related art without the cocurrent flow $CO_2$ absorber 22 as in Comparative Examples 1 and 2. Each of Examples 3-1 to 3-3 is a test example where the height of the cocurrent flow $CO_2$-absorbing unit 19 of the cocurrent flow $CO_2$ absorber 22, when the filling height of the countercurrent $CO_2$-absorbing unit 20 of the $CO_2$ absorber 23 is 100%, is 28% so that the reflux ratio (A2/A1) of the rich solution 18 is 0. In Example 3-1, the cross-section ratio (S1/S2) of the cocurrent flow $CO_2$-absorbing unit 19 was 1. In Example 3-2, the cross-section ratio (S1/S2) of the cocurrent flow $CO_2$-absorbing unit 19 was 0.75. In example 3-3, the cross-section ratio (S1/S2) of the cocurrent flow $CO_2$-absorbing unit 19 was 0.5.

As illustrated in FIG. 6, when the cross-section ratio (S1/S2) of the cocurrent flow $CO_2$-absorbing unit 19 was 0.75 or 1, the reduction rate of the amount of steam consumed by the reboiler 36 was large as compared to when the cross-section ratio (S1/S2) of the cocurrent flow $CO_2$-absorbing unit 19 is 0.5. The reduction rate of the amount of steam consumed by the reboiler 36 when the cross-section ratio (S1/S2) of the cocurrent flow $CO_2$-absorbing unit 19 was 0.75 was substantially the same as that when the cross-section ratio (S1/S2) of the cocurrent flow $CO_2$-absorbing unit 19 was 1.0. Accordingly, when the cocurrent flow $CO_2$ absorber 22 is provided on the flue gas duct 29, it is possible to increase the reduction rate of the amount of steam, which is consumed by the reboiler 36, by making the cross-section ratio (S1/S2) of the cocurrent flow $CO_2$-absorbing unit 19 larger than 0.5.

[Influence on the Reduction Rate of the Amount of Steam, Which is Consumed by the Reboiler 36, When the Cross-Section Ratio (S1/S2) of the Cocurrent Flow $CO_2$-Absorbing Unit 19 and the Filling Height of the Cocurrent Flow $CO_2$-Absorbing Unit 19 are Changed]

Figure 7:
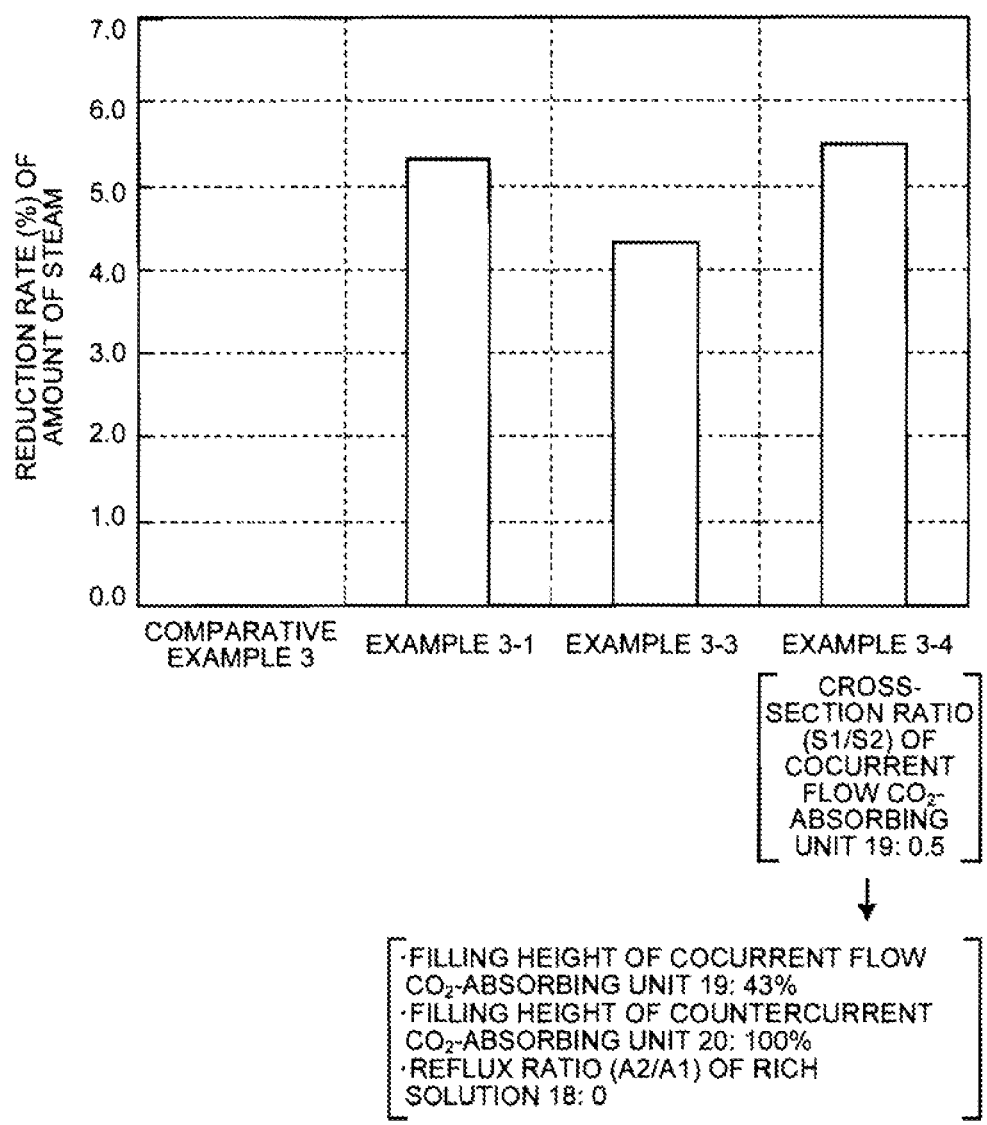
FIG. 7 is a diagram illustrating a relation between a case where a cross-section ratio (S1/S2) of the cocurrent flow $CO_2$-absorbing unit and the filling height of the cocurrent flow $CO_2$-absorbing unit are changed, and the reduction rate of the amount of steam that is consumed by the reboiler.

FIG. 7 is a diagram illustrating a relation between a case where the cross-section ratio (S1/S2) of the cocurrent flow $CO_2$-absorbing unit 19 and the filling height of the cocurrent flow $CO_2$-absorbing unit 19 are changed, and the reduction rate of the amount of steam that is consumed by the reboiler 36. Example 3-4 is a test example where the height of the cocurrent flow $CO_2$-absorbing unit 19 of the cocurrent flow $CO_2$ absorber 22 is 43%, the reflux ratio (A2/A1) of the rich solution 18 is 0, and the cross-section ratio (S1/S2) of the cocurrent flow $CO_2$-absorbing unit 19 is 0.5 when the height of the countercurrent $CO_2$-absorbing unit 20 of the $CO_2$ absorber 23 is 100%.

As illustrated in FIG. 7, when the cross-section ratio (S1/S2) of the cocurrent flow $CO_2$-absorbing unit 19 was 0.5, the reduction rate of the amount of steam consumed by the reboiler 36 was small as compared to when the cross-section ratio (S1/S2) of the cocurrent flow $CO_2$-absorbing unit 19 is 1. However, when the filling height of the cocurrent flow $CO_2$-absorbing unit 19 was increased, the reduction rate of the amount of steam consumed by the reboiler 36 was increased as compared to when the cross-section ratio (S1/S2) of the cocurrent flow $CO_2$-absorbing unit 19 was 1. Accordingly, when the cocurrent flow $CO_2$ absorber 22 is provided on the flue gas duct 29 and the cross-section ratio (S1/S2) of the cocurrent flow $CO_2$-absorbing unit 19 is small, it is possible to increase the reduction rate of the amount of steam, which is consumed by the reboiler 36, by making the filling height of the cocurrent flow $CO_2$-absorbing unit 19 high.

[A Relation Between the Reduction Rate of the Amount of Steam, Which is Consumed by the Reboiler 36, and the Filling Height of the Cocurrent Flow $CO_2$-Absorbing Unit 19 of the Cocurrent Flow $CO_2$ Absorber 22 When the Countercurrent $CO_2$-Absorbing Unit 20 of the $CO_2$ Absorber 23 is Formed in Two Stages]

Figure 8:
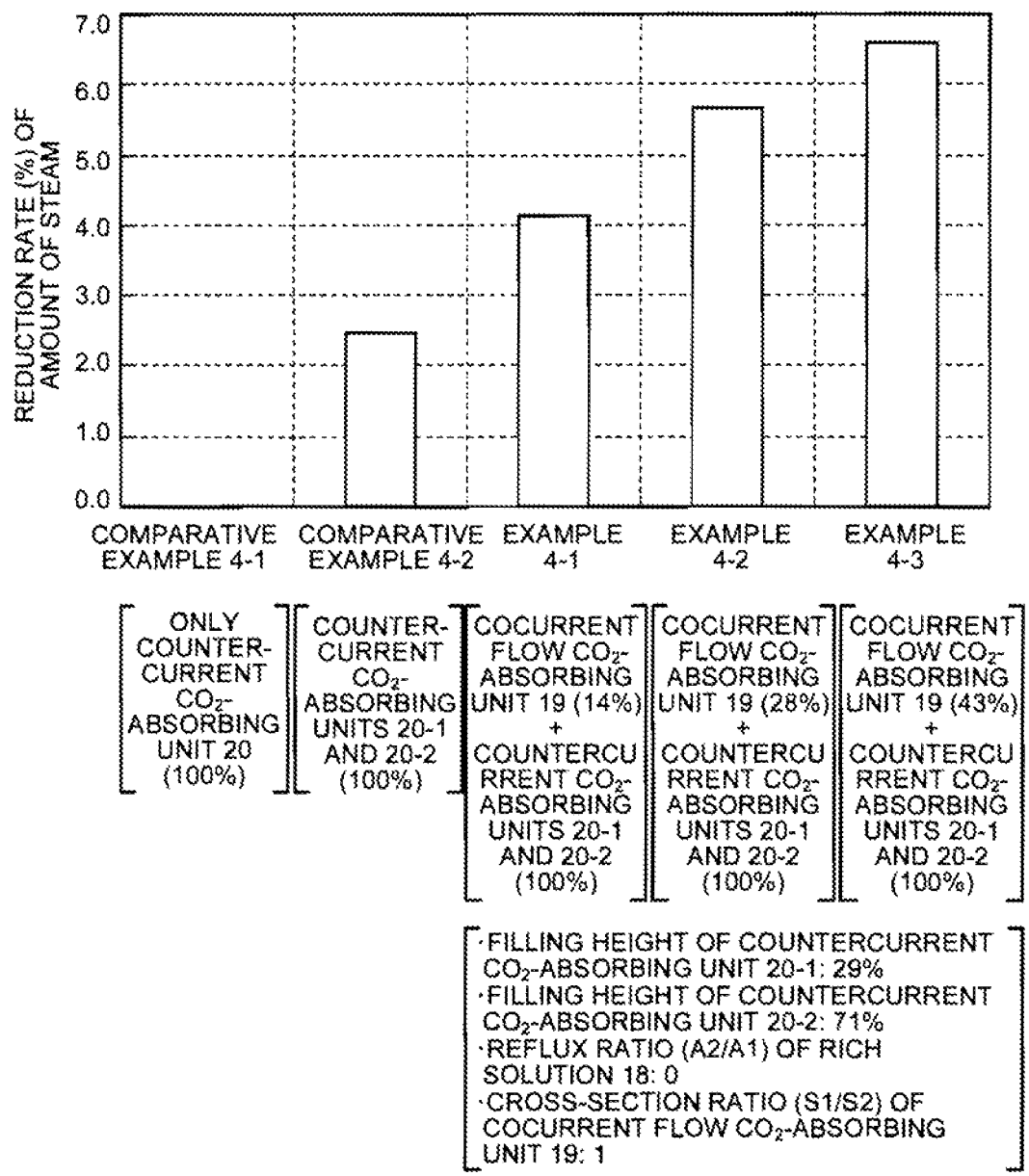
FIG. 8 is a diagram illustrating a relation between the filling height of the cocurrent flow $CO_2$-absorbing unit of the cocurrent flow $CO_2$ absorber and the reduction rate of the amount of steam that is consumed by the reboiler.

FIG. 8 is a diagram illustrating a relation between the filling height of the cocurrent flow $CO_2$-absorbing unit 19 of the cocurrent flow $CO_2$ absorber 22 and the reduction rate of the amount of steam that is consumed by the reboiler 36. Meanwhile, Comparative Example 4-1 is a test example where the filling height of the countercurrent $CO_2$-absorbing unit 20 of the $CO_2$ absorber 23 is 100% in the $CO_2$ recovery device in the related art without the cocurrent flow $CO_2$ absorber 22 as in Comparative Example 1. In Comparative Example 4-1, the amount of steam consumed by the reboiler 36 was a reference value (0%). Comparative Example 4-2 is a test example where the countercurrent $CO_2$-absorbing unit 20 of the $CO_2$ absorber 23 is formed in two stages and the sum of the filling heights of the countercurrent $CO_2$-absorbing units 20-1 and 20-2 is 100% in the $CO_2$ recovery device in the related art without the cocurrent flow $CO_2$ absorber 22. Example 4-1 is a test example where the filling height of the cocurrent flow $CO_2$-absorbing unit 19 is 14% when the sum of the filling heights of the countercurrent $CO_2$-absorbing units 20-1 and 20-2 of the $CO_2$ absorber 23 is 100%. Example 4-2 is a test example where the filling height of the cocurrent flow $CO_2$-absorbing unit 19 is 28% when the sum of the filling heights of the countercurrent $CO_2$-absorbing units 20-1 and 20-2 of the $CO_2$ absorber 23 is 100%. Example 4-3 is a test example where the filling height of the cocurrent flow $CO_2$-absorbing unit 19 is 43% when the sum of the filling heights of the countercurrent $CO_2$-absorbing units 20-1 and 20-2 of the $CO_2$ absorber 23 is 100%. Further, in all of Examples 4-1 to 4-3 and Comparative Example 4-2, the filling height of the countercurrent $CO_2$-absorbing unit 20-1 was 29% and the filling height of the countercurrent $CO_2$-absorbing unit 20-2 was 71%. Furthermore, in all of Examples 4-1 to 4-3 and Comparative Examples 4-1 and 4-2, the reflux ratio (A2/A1) of the rich solution 18 was 0 and the cross-section ratio (S1/S2) of the cocurrent flow $CO_2$-absorbing unit 19 was 1.

As illustrated in FIG. 8, when the $CO_2$ absorber 23 included the countercurrent $CO_2$-absorbing units 20-1 and 20-2 so that the countercurrent $CO_2$-absorbing unit 20 of the $CO_2$ absorber 23 was formed in two stages, the reduction rate of the amount of steam consumed by the reboiler 36 was increased as compared to when the $CO_2$ absorber 23 included the countercurrent $CO_2$-absorbing unit 20 so that the countercurrent $CO_2$-absorbing unit 20 of the $CO_2$ absorber 23 was formed in one stage (see Comparative Examples 4-1 and 4-2). Moreover, when the countercurrent $CO_2$-absorbing unit 20 of the $CO_2$ absorber 23 was formed in two stages and the cocurrent flow $CO_2$ absorber 22 was provided on the flue gas duct 29 as in Example 4-1, the reduction rate of the amount of steam consumed by the reboiler 36 was further increased. Further, as in Examples 4-1 to 4-3, the reduction rate of the amount of steam consumed by the reboiler 36 was increased as the filling height of the cocurrent flow $CO_2$-absorbing unit 19 of the cocurrent flow $CO_2$ absorber 22 was increased. Accordingly, when the countercurrent $CO_2$-absorbing unit 20 of the $CO_2$ absorber 23 is formed in a plurality of stages and the cocurrent flow $CO_2$ absorber 22 is provided on the flue gas duct 29, it is possible to further increase the reduction rate of the amount of steam that is consumed by the reboiler 36. Furthermore, it is possible to increase the reduction rate of the amount of steam, which is consumed by the reboiler 36, as the height of the cocurrent flow $CO_2$-absorbing unit 19 of the cocurrent flow $CO_2$ absorber 22 is increased.

<When the Cocurrent Flow $CO_2$ Absorber 22 was Provided in the Cooling Tower 16 and Between the Cooling Tower 16 and the $CO_2$ Absorber 23>

[A Relation Between the Filling Weight of the Countercurrent $CO_2$-Absorbing Unit 81, Which is Provided in the Cooling Tower 16, and the Reduction Rate of the Amount of Steam Consumed by the Reboiler 36 When the $CO_2$-Absorbing Unit of the $CO_2$ Absorber 23 is Formed in Two Stages]

FIG. 9 is a diagram illustrating a relation between the filling height of the countercurrent $CO_2$-absorbing unit 81 and the reduction rate of the amount of steam that is consumed by the reboiler 36. Meanwhile, Comparative Example 5-1 is a test example where the filling height of the countercurrent $CO_2$-absorbing unit 20 of the $CO_2$ absorber 23 is 100% in the $CO_2$ recovery device in the related art without the cocurrent flow $CO_2$ absorber 22 as in Comparative Example 4-1. In Comparative Example 5-1, the amount of steam consumed by the reboiler 36 was a reference value (0%). Comparative Example 5-2 is a test example where the countercurrent $CO_2$-absorbing unit 20 of the $CO_2$ absorber 23 is formed in two stages and the sum of the filling heights of the countercurrent $CO_2$-absorbing units 20-1 and 20-2 is 100% in the $CO_2$ recovery device in the related art without the cocurrent flow $CO_2$ absorber 22 as in Comparative Example 4-2. Comparative Example 5-3 is a test example where the sum of the filling heights of the cocurrent flow $CO_2$-absorbing unit 19 is 14%, the countercurrent $CO_2$-absorbing unit 20 of the $CO_2$ absorber 23 is formed in two stages, and the sum of the filling heights of the countercurrent $CO_2$-absorbing units 20-1 and 20-2 is 100% in the $CO_2$ recovery device including the cocurrent flow $CO_2$ absorber 22. Example 5-1 is a test example where the filling height of the countercurrent $CO_2$-absorbing unit 81 is 14% when the sum of the filling heights of the countercurrent $CO_2$-absorbing units 20-1 and 20-2 of the $CO_2$ absorber 23 is 100%. Example 5-2 is a test example where the filling height of the countercurrent $CO_2$-absorbing unit 81 is 28% when the sum of the filling heights of the countercurrent $CO_2$-absorbing units 20-1 and 20-2 of the $CO_2$ absorber 23 is 100%. Example 5-3 is a test example where the filling height of the countercurrent $CO_2$-absorbing unit 81 is 43% when the sum of the filling heights of the countercurrent $CO_2$-absorbing units 20-1 and 20-2 of the $CO_2$ absorber 23 is 100%. Further, in all of Examples 5-1 to 5-3 and Comparative Example 5-2, the filling height of the countercurrent $CO_2$-absorbing unit 20-1 was 29% and the filling height of the countercurrent $CO_2$-absorbing unit 20-2 was 71%. Furthermore, in all of Examples 5-1 to 5-3 and Comparative Example 5-3, the filling height of the cocurrent flow $CO_2$-absorbing unit 19 of the cocurrent flow $CO_2$ absorber 22 was 28%. Moreover, in all of Examples 5-1 to 5-3 and Comparative Example 5-3, the reflux ratio (A2/A1) of the rich solution 18A was 0 and the cross-section ratio (S1/S2) of the cocurrent flow $CO_2$-absorbing unit 19 was 1. Further, in each of Examples 5-1 to 5-3, the reflux ratio (A4/A3) of the rich solution 18B between the flow rate A3 of the rich solution 18A, which is supplied to the cooling tower 16 from the cocurrent flow $CO_2$ absorber 22, and the flow rate A4 of the rich solution 18, where the rich solution 18B stored in the cooling tower 16 was supplied to the cocurrent flow $CO_2$ absorber 22 through a rich solution extraction-branch line 83, was 0.

As illustrated in FIG. 9, the reduction rate of the amount of steam consumed by the reboiler 36 was increased when the countercurrent $CO_2$-absorbing unit 81 was provided in the cooling tower 16 and the cocurrent flow $CO_2$ absorber 22 was provided between the cooling tower 16 and the $CO_2$ absorber 23 (see Examples 5-1 to 5-3). Moreover, the reduction rate of the amount of steam consumed by the reboiler 36 was increased as the filling height of the countercurrent $CO_2$-absorbing unit 81 provided in the cooling tower 16 was increased. Accordingly, it is possible to further increase the reduction rate of the amount of steam, which is consumed by the reboiler 36, by providing the countercurrent $CO_2$-absorbing unit 81 in the cooling tower 16 and providing the cocurrent flow $CO_2$ absorber 22 on the flue gas duct 29. Further, it is possible to increase the reduction rate of the amount of steam, which is consumed by the reboiler 36, as the filling height of the countercurrent $CO_2$-absorbing unit 81 provided in the cooling tower 16 is increased.

REFERENCE SIGNS LIST

10 $CO_2$ RECOVERY DEVICE
11 COOLING UNIT
12 $CO_2$-ABSORBING UNIT
13 ABSORBENT REGENERATING UNIT
14A to 14C, 14C-1, 14C-2 FLUE GAS
15, 48, 75 WATER
16 COOLING TOWER
17 $CO_2$ ABSORBENT (LEAN SOLUTION)
18, 18A, 18B RICH SOLUTION
19 COCURRENT FLOW $CO_2$-ABSORBING UNIT
20, 20-1, 20-2, 81 COUNTERCURRENT $CO_2$-ABSORBING UNIT
21 ABSORBENT REGENERATOR
22 COCURRENT FLOW $CO_2$ ABSORBER
23 $CO_2$ ABSORBER
24, 24A, 24B SEMI-RICH SOLUTION
26, 31, 43, 43-1, 43-2, 49, 82 SPRAY NOZZLE
27, 33, 52, 56, 84 COOLER
28, 34, 53, 57, 65, 73, 85 COOLING WATER
29 FLUE GAS DUCT
32 SEMI-RICH SOLUTION EXTRACTION LINE
36 REGENERATING SUPERHEATER (REBOILER)
37, 87 RICH SOLUTION FEED LINE
38 RICH SOLVENT PUMP
39 RICH/LEAN SOLUTION HEAT EXCHANGER
41, 83, 88 RICH SOLUTION EXTRACTION-BRANCH LINE
44 WATER WASHING UNIT
45 DEMISTER
47 $CO_2$-REMOVED FLUE GAS
50, 55, 86 RECEIVING UNIT
51 PUMP
61 STEAM
62 SATURATED STEAM
63 LEAN SOLVENT PUMP
64 LEAN SOLVENT COOLER
71, 76 $CO_2$ GAS
72 CONDENSER
74 SEPARATION DRUM
77 CONDENSED WATER CIRCULATING PUMP

The invention claimed is:
1. A $CO_2$ recovery device comprising:
a cooling tower including a cooling unit for bringing flue gas, which contains $CO_2$, into contact with water so as to cool the flue gas;
a $CO_2$ absorber including a $CO_2$-absorbing unit for bringing the flue gas into contact with a $CO_2$ absorbent absorbing $CO_2$ so as to remove $CO_2$ from the flue gas; and
a regenerator including an absorbent regenerating unit for releasing $CO_2$ from a rich solution which is the $CO_2$ absorbent having absorbed $CO_2$ so as to regenerate the

$CO_2$ absorbent and discharge the $CO_2$ absorbent as a lean solution, wherein the lean solution is reused in the $CO_2$-absorbing unit, at least one countercurrent $CO_2$-absorbing unit provided in the $CO_2$ absorber, for bringing the flue gas into contact with the $CO_2$ absorbent in a countercurrent flow so as to remove $CO_2$ from the flue gas;

a cocurrent flow $CO_2$-absorber provided upstream of the $CO_2$ absorber, the cocurrent flow $CO_2$-absorber including at least one cocurrent flow $CO_2$-absorbing unit for bringing the flue gas into contact with the $CO_2$ absorbent in a cocurrent flow so as to remove $CO_2$ from the flue gas;

a semi-rich solution extraction line for supplying a semi-rich solution to a flue gas introduction side of the cocurrent flow $CO_2$-absorbing unit, the semi-rich solution being the $CO_2$ absorbent having absorbed $CO_2$ in the $CO_2$-absorbing unit and stored in a bottom part of the $CO_2$-absorbing unit; and a rich solution feed line for feeding the rich solution stored in a bottom part of the cocurrent flow $CO_2$-absorber to the absorbent regenerating unit, where a packing height of the cocurrent flow $CO_2$-absorbing unit is equal to or less than 43% when a packing height of the countercurrent $CO_2$-absorbing unit of the $CO_2$ absorber is 100%.

2. The $CO_2$ recovery device according to claim 1,
further comprising a cooler interposed on the semi-rich solution extraction line, for cooling the semi-rich solution.

3. The $CO_2$ recovery device according to claim 1,
wherein a cross-section ratio (S1/S2) of a cross-sectional area (S1) of the cocurrent flow $CO_2$-absorbing unit and a cross-sectional area (S2) of the countercurrent $CO_2$-absorbing unit of the $CO_2$ absorber is equal to or less than 1.

4. A $CO_2$ recovery device comprising:
a cooling tower including a cooling unit for bringing flue gas, which contains $CO_2$, into contact with water so as to cool the flue gas;

a $CO_2$ absorber including a $CO_2$-absorbing unit for bringing flue gas into contact with a $CO_2$ absorbent absorbing $CO_2$ so as to remove $CO_2$ from the flue gas; and a regenerator including an absorbent regenerating unit for releasing $CO_2$ from a rich solution which is the $CO_2$ absorbent having absorbed $CO_2$ so as to regenerate the $CO_2$ absorbent and discharge the $CO_2$ absorbent as a lean solution, wherein the lean solution is reused in the $CO_2$-absorbing unit, at least one first countercurrent $CO_2$-absorbing unit provided in the $CO_2$ absorber, for bringing the flue gas into contact with the $CO_2$ absorbent in a countercurrent flow so as to remove $CO_2$ from the flue gas;

a cocurrent flow $CO_2$-absorber provided upstream of the $CO_2$ absorber, the cocurrent flow $CO_2$-absorber including at least one cocurrent flow $CO_2$-absorbing unit for bringing the flue gas into contact with the $CO_2$ absorbent in a cocurrent flow so as to remove $CO_2$ from the flue gas;

a semi-rich solution extraction line for supplying a semi-rich solution to a flue gas introduction side of the cocurrent flow $CO_2$-absorbing unit, the semi-rich solution being the $CO_2$ absorbent having absorbed $CO_2$ in the $CO_2$-absorbing unit and stored in a bottom part of the $CO_2$-absorbing unit;

a second countercurrent $CO_2$-absorbing unit provided downstream of the cooling unit of the cooling tower, for bringing the flue gas into contact with the $CO_2$ absorbent in a countercurrent flow so as to remove $CO_2$ from the flue gas;

a rich solution extraction line for supplying a rich solution to a top side of the second countercurrent $CO_2$-absorbing unit in the cooling tower, the rich solution being a $CO_2$ absorbent having absorbed $CO_2$ in the cocurrent flow $CO_2$-absorbing unit and stored in a bottom part of the cocurrent flow $CO_2$-absorbing unit; and a rich solution feed line for feeding a rich solution to the absorbent regenerating unit, the rich solution being a $CO_2$ absorbent having absorbed $CO_2$ in the second countercurrent $CO_2$-absorbing unit and stored in a receiving unit of the second countercurrent $CO_2$-absorbing unit, where a packing height of the cocurrent flow $CO_2$-absorbing unit is equal to or less than 43% when a packing height of the first countercurrent $CO_2$-absorbing unit of the $CO_2$ absorber is 100%.

5. The $CO_2$ recovery device according to claim 4,
further comprising a cooler interposed on the semi-rich solution extraction line, for cooling the semi-rich solution.

6. The $CO_2$ recovery device according to claim 4,
wherein a cross-section ratio (S1/S2) of a cross-sectional area (S1) of the cocurrent flow $CO_2$-absorbing unit and a cross-sectional area (S2) of the first countercurrent $CO_2$-absorbing unit of the $CO_2$ absorber is equal to or less than 1.

* * * * *